(12) United States Patent
Tanaka (10) Patent No.: US 7,800,851 B2
(45) Date of Patent: Sep. 21, 2010

(54) LENS APPARATUS

(75) Inventor: Isao Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/370,849

(22) Filed: Feb. 13, 2009

(65) Prior Publication Data

US 2009/0147383 A1 Jun. 11, 2009

Related U.S. Application Data

(63) Continuation of application No. 12/136,367, filed on Jun. 10, 2008, now Pat. No. 7,511,903.

(30) Foreign Application Priority Data

Jun. 15, 2007 (JP) .............................. 2007-158335

(51) Int. Cl.
*G02B 7/02* (2006.01)
(52) U.S. Cl. ...................................... 359/823; 359/822
(58) Field of Classification Search .................. 359/823
See application file for complete search history.

(56) References Cited

U.S. PATENT DOCUMENTS 7,145,737 B2 12/2006 Tanaka
7,511,903 B2 * 3/2009 Tanaka ........................ 359/823
2006/0012700 A1 1/2006 Tanaka
2006/0119734 A1 * 6/2006 Neel ........................... 348/375

FOREIGN PATENT DOCUMENTS

JP 09-068640 A 3/1997
JP 2005-328496 A 11/2005

* cited by examiner

*Primary Examiner*—Jordan M. Schwartz
*Assistant Examiner*—James C Jones
(74) *Attorney, Agent, or Firm*—Canon U.S.A., Inc. I.P. Division (57) ABSTRACT

Provided is a lens apparatus for driving an optical member based on a demand signal from a demand device, including: a connector for receiving the demand signal from the demand device by wire; a wireless receiver for wirelessly receiving the demand signal from the demand device; and an identifying section for identifying whether or not the demand device and the lens apparatus have a wired connection with each other, in which the demand signal from the demand device is selected based on a result obtained by the identifying section, and the optical member is driven based on the selected demand signal.

4 Claims, 9 Drawing Sheets

| FIG. 2A | FIG. 2B |

LENS APPARATUS

CROSS-REFERENCE TO RELATED APPLICATIONS

The present application is a Continuation of U.S. patent application Ser. No. 12/136,367 filed Jun. 10, 2008, currently pending, to which priority under 35 U.S.C. §120 is claimed. The contents of prior application Ser. No. 12/136,367 is hereby incorporated by reference for all purposes as if fully set forth herein. This application also claims foreign priority benefits under 35 U.S.C. §119 to Japanese Patent Application No. 2007-158335 filed in Japan on Jun. 15, 2007, which is hereby incorporated by reference herein.

BACKGROUND OF THE INVENTION

1. Field of the Invention

The present invention relates to a lens apparatus which is used for, for example, a broadcasting television lens and includes movable optical members such as a zoom lens, a focus lens, and an aperture stop, which are drive-controlled by multiple demand devices.

2. Description of the Related Art

Systems for controlling movable optical members such as a zoom lens and a focus lens in a television camera are described in, for example, U.S. Pat. No. 7,145,737 and Japanese Patent Application Laid-Open No. H09-068640. In the systems, a lens body is connected with a zoom demand device for generating a demand signal for zoom drive and a focus demand device for generating a demand signal for focus drive.

In addition to the demand devices, multiple demand devices such as a demand device for generating an aperture stop demand signal and a demand device for controlling an anti-vibration optical system can be connected with the lens body. The lens body is cable-connected with each of the demand devices by using a multi-pin connector described in U.S. Pat. No. 7,145,737.

In a case of studio photographing, there is a tripod operation in which the television camera, a television lens, the zoom demand device, and the focus demand device are attached to a tripod. In addition to this, there is a shoulder-mounted operation in which the zoom demand device and the focus demand device are not used and the television camera and the television lens are combined with each other to be mounted on the shoulder of a camera operator.

Figure 8:
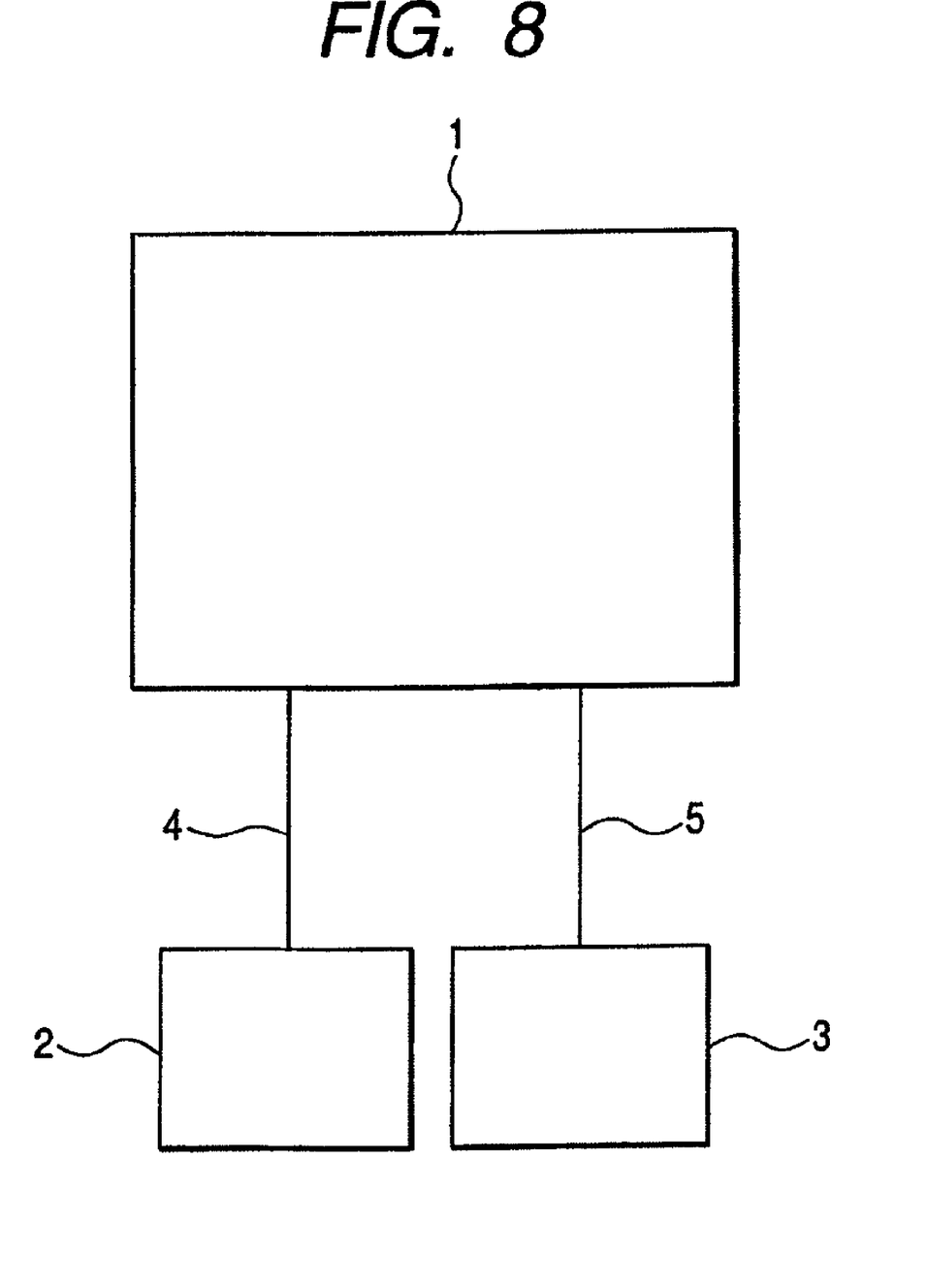
FIG. 8 is a block diagram illustrating a conventional television photographing system.

FIG. 8 is a block diagram illustrating the conventional television photographing system described above. A zoom demand device 2 for operating a zoom lens of a lens body 1 can generate a return switch demand, a VTR switch demand, a shot demand, and a shot storage demand in addition to a zoom demand for zoom drive control. A focus demand device 3 for operating a focus lens of the lens body 1 can generate the same switch demands as those in the zoom demand device 2 in addition to a focus demand for focus drive control. The lens body 1 is connected with the zoom demand device 2 and the focus demand device 3 by using cables 4 and 5, each of which is normally prepared, includes approximately 20 wires, and has a length of approximately 1 meter.

In the conventional technology described above, the lens body 1 is connected with the zoom demand device 2 and the focus demand device 3 by using the multi-wire cables 4 and 5. When multiple demand devices are to be further connected with the lens body 1, cables equal in number to the demand devices are required.

For example, there may be crane photographing in which a camera and a lens are provided to the tip end of a crane whose length is approximately 3 to 5 meters and demand devices are operated for photographing by a camera operator at the base of the crane. There may also be photographing of savage animals at a distance from a camera and a lens which are installed in nature. In such cases, the length of the normal cable provided between the lens body and the demand device is insufficient, so it is necessary to manufacture and install a special extension cable. Therefore, the manufacturing and installation of the specific extension cable require cost and time. Cables each including as many as approximately 20 long wires are installed to correspond to the number of demand devices, which takes time and labor.

It is desired that an operational mode can be changed according to a photographing situation by instant switching between the tripod operation and the shoulder-mounted operation in a case where a single television camera and a single television lens are used. In the case of the tripod operation, the television camera and the television lens can be instantly removed as a unit. However, in the case where the zoom demand device and the focus demand device are used, until the connection cable is removed from the television lens, the shoulder-mounted operation cannot be performed, so the instant switching cannot be made.

SUMMARY OF THE INVENTION

In order to achieve above-mentioned objects, the present invention provides a lens apparatus for driving an optical member based on a demand signal from a demand device, comprising: a connector receiving the demand signal from the demand device by wire; a wireless receiver wirelessly receiving the demand signal from the demand device; and an identifying section identifying whether or not the demand device and the lens apparatus have a wired connection with each other, wherein: the demand signal from the demand device is selected based on a result obtained by the identifying section; and the optical member is driven based on the selected demand signal.

In order to achieve the above-mentioned objects, the present invention also provides an image pickup apparatus, comprising: a lens apparatus; and a demand device transmitting a demand signal to the lens apparatus, wherein: the lens apparatus driving an optical member based on the demand signal from the demand device, comprises: a connector receiving the demand signal from the demand device by wire; a wireless receiver wirelessly receiving the demand signal from the demand device; and an identifying section identifying whether or not the demand device and the lens apparatus have a wired connection with each other, wherein the demand signal from the demand device is selected based on a result obtained by the identifying section; and the optical member is driven based on the selected demand signal.

Further features of the present invention will become apparent from the following description of exemplary embodiments with reference to the attached drawings.

DESCRIPTION OF THE EMBODIMENTS

An object of the present invention is to provide a lens apparatus which is easily installed and has no reduction in reliability even in a case of photographing in which a lens body is separated from a demand device.

In particular, operational mode switching of the lens body and the demand device, which is changed/required according to a state of photographing such as drama photographing, music photographing, news photographing, sport photographing, studio photographing, or outdoor photographing, is easily enabled, and the improvement of operability is enabled.

Another object of the present invention is to provide a continuous lens drive state regardless of insertion/removal of a connection cable, thereby avoiding the interruption of the photographing state.

Hereinafter, the present invention will be described in detail with reference to embodiments illustrated in FIGS. 1A to 7.

Embodiment 1

Figures 1, 1A:
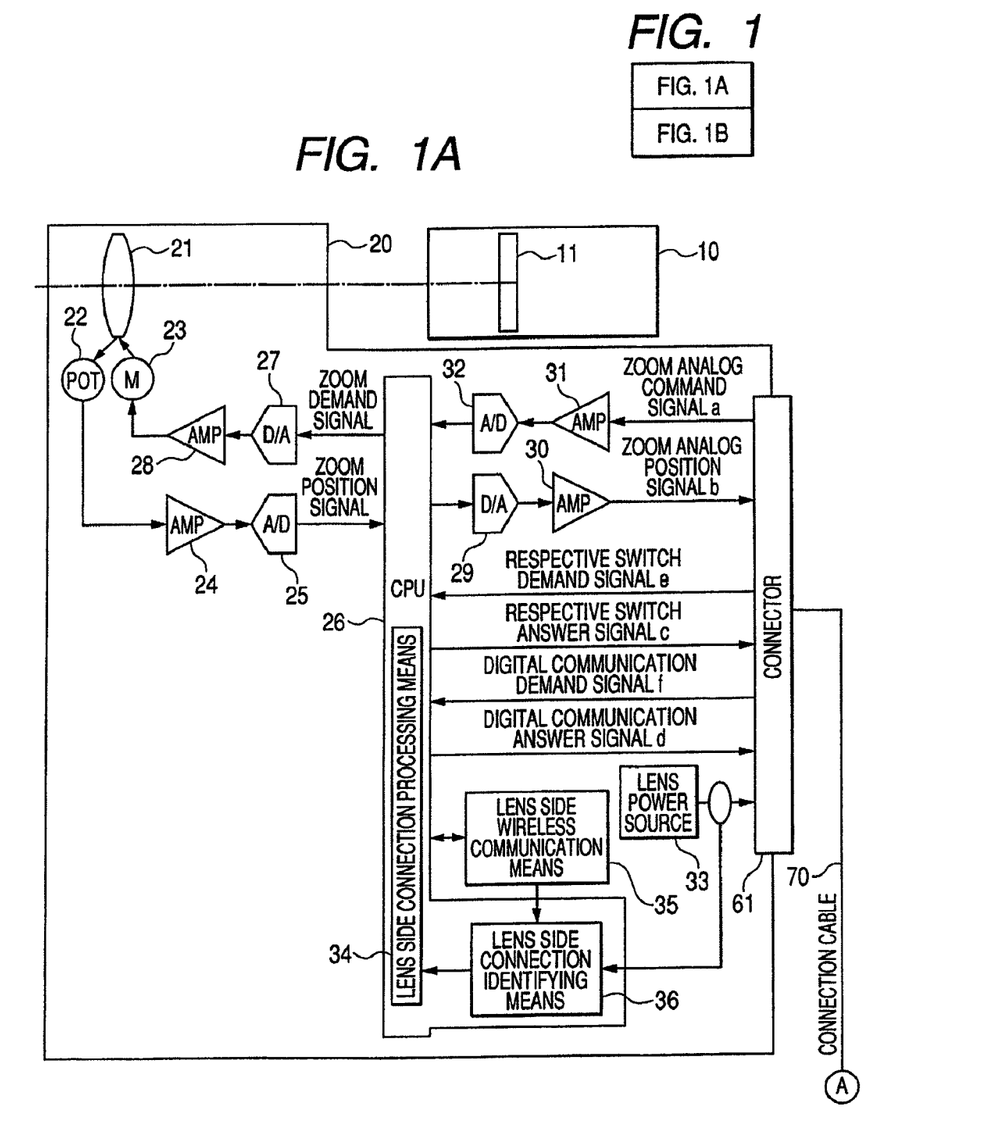
FIG. 1 is comprised of FIGS. 1A and 1B illustrating a block circuit structural diagram illustrating Embodiment 1 of the present invention.
Figure 1B:
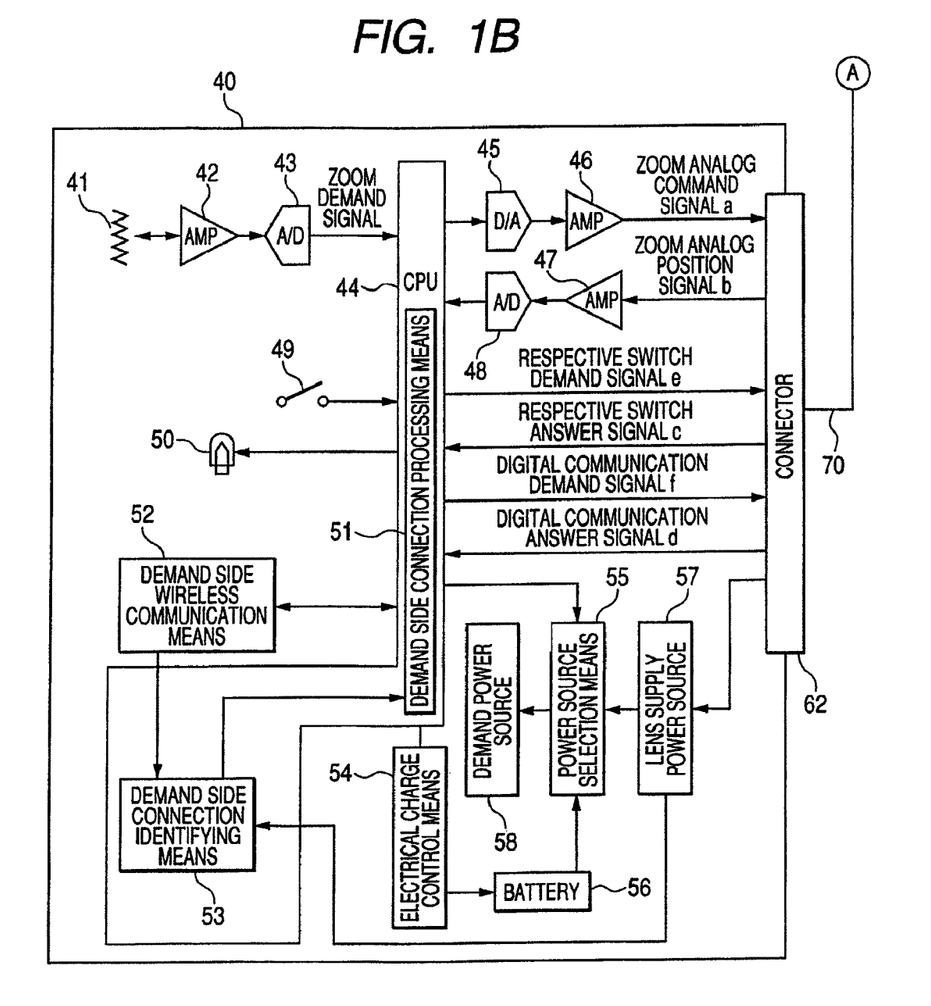

FIGS. 1A and 1B are block circuit structural diagrams illustrating Embodiment 1 of the present invention. An image pickup apparatus includes a camera body 10, a lend body 20 which is attached (detachably attachable) to the camera body 10, and a zoom demand device 40 having a wired or wireless connection with the lens body 20. The zoom demand device 40 transmits a signal (demand value signal) for driving a zoom lens to the lens body 20 wirelessly or by wire. When the zoom demand device 40 is to be connected with the lens body 20 by wire, a lens side connector 61 is connected with a demand side connector 62 through a connection cable (wire) 70.

The camera body 10 has an image pickup element 11 including a photoelectric conversion device such as a charge-coupled device (CCD). The lens body 20 has a zoom lens 21 including movable optical members (movable optical units), for guiding a photographing light beam (light beam from object) to the image pickup element 11. The lens body 20 further has a focus lens and an aperture stop (not shown) which are disposed on substantially the same optical axis as that of the movable optical members described above. In this embodiment, the operation of the zoom lens 21 will be mainly described. Note that the operation of the focus lens and the aperture stop can be controlled by using the demand device as in the case of the zoom lens.

A zoom potentiometer (POT) 22 and a zoom motor (M) 23 are attached to the zoom lens 21. A zoom position signal output from the zoom potentiometer 22 is input to a lens CPU 26 through an amplifier (AMP) 24 and an A/D converter 25. A zoom demand signal output from the lens CPU 26 is input to the zoom motor 23 through a D/A converter 27 and an amplifier (AMP) 28.

A zoom analog position signal "b" output from the lens CPU 26 through a D/A converter 29 and an amplifier (AMP) 30 is supplied to the lens side connector 61. A zoom analog command signal "a" output from the lens side connector 61 is supplied to the lens CPU 26 through an amplifier (AMP) 31 and an A/D converter 32. A power source line from a lens power source 33 is connected with the lens side connector 61.

The lens CPU 26 includes a lens side connection processor (processing means, means for switching between wired connection and wireless connection with demand device) 34 and a lens side connection identifying means (connection identifying unit, means for identifying whether wired connection or wireless connection is made with demand device) 36. The lens CPU 26 is connected with a lens side wireless communication means (unit) 35. An output of the lens side wireless communication means (unit) 35 is connected with the lens side connection identifying means (unit) 36. A unit for detecting a power source current supplied from the lens power source 33 to the lens side connector 61 is connected with the lens side connection identifying means (unit) 36.

A respective switch answer signal "c" and a digital communication answer signal "d" from the lens CPU 26 are output to the lens side connector 61. A respective switch demand signal "e" and a digital communication demand signal "f" from the lens side connector 61 are output to the lens CPU 26. The signals are various signals required in a case where the lens body 20 is to be connected with the zoom demand device 40 through the lens side connector 61 and the demand side connector 62.

In the lens body 20, the D/A converter 27 converts the zoom demand signal (digital value) from the lens CPU 26 into an analog value. The amplifier 28 power-amplifies the analog (drive) signal from the D/A converter 27 to drive the zoom motor 23, thereby operating the zoom lens 21. The amplifier 24 amplifies a signal from the zoom potentiometer 22. The A/D converter 25 converts an analog voltage of the zoom potentiometer 22 into a digital value. The lens CPU 26 reads the digital value as the zoom position signal. An encoder instead of the zoom potentiometer 22 may be used to detect a position of the zoom lens 21.

The zoom analog command signal "a" output from the zoom demand device 40 through the lens side connector 61, the demand side connector 62 and the connection cable 70 is captured into the lens CPU 26 through the amplifier 31 and the A/D converter 32. A signal output from the lens CPU 26 through the D/A converter 29 and the amplifier 30 is sent as the zoom analog position signal "b" to the zoom demand device 40 through the lens side connector 61, the demand side connector 62 and the connection cable 70.

The lens power source 33 supplies electrical power to the zoom demand device 40 through the lens side connector 61, the demand side connector 62 and the connection cable 70. The lens side wireless communication means (unit) 35 operates when wireless connection is made with the zoom demand device 40.

The lens side connection identifying means (unit) 36 identifies whether the connection with the zoom demand device 40 is wired connection through the lens side connector 61 and the demand side connector 62 or wireless connection using the lens side wireless communication means (unit) 35. The lens side connection identifying means (unit) 36 detects a change in connection state between wired connection and wireless connection and whether or not the demand device is changed when the connection state changes. The lens side connection processor (processing unit, processing means) 34 selects whether the demand device 40 is to be connected by wire or wirelessly based on a result obtained by identification of the lens side connection identifying means (unit) 36 and selects whether or not a demand before the change in connection state is temporarily held when the connection state changes, based on the result.

In the zoom demand device 40, a zoom demand signal from a potentiometer 41 linked to a zoom operation section is supplied to a demand CPU 44 through an amplifier 42 and an A/D converter 43. The zoom analog demand signal "a" output from the demand CPU 44 through a D/A converter 45 and an amplifier 46 is supplied to the demand side connector 62. The zoom analog position signal "b" from the demand side connector 62 is supplied to the demand CPU 44 through an amplifier 47 and an A/D converter 48. Outputs of various switches 49 are connected with the demand CPU 44. Respective display lamps 50 are turned on in response to outputs of the demand CPU 44.

The respective switch answer signal "c" and the digital communication answer signal "d" from the demand side connector 62 are supplied to the demand CPU 44. The respective switch demand signal "e" and the digital communication demand signal "f" from the demand CPU 44 are supplied to the demand side connector 62.

The demand CPU 44 includes a demand side connection processor (processing unit) 51 and a demand side connection identifying means (unit) 53. The demand CPU 44 is connected with a demand side wireless communication means (unit) 52. An output of the demand side wireless communication means (unit) 52 is connected with the demand side connection identifying means (unit) 53. Outputs of the demand CPU 44 are connected with an electrical charge control means (unit) 54 and a power source selection means (unit) 55. An output of the electrical charge control means (unit) 54 is connected with the power source selection means (unit) 55 through a battery 56.

A power source line from the demand side connector 62 is connected with a lens supply power source 57. Outputs of the lens supply power source 57 are connected with the power source selection means (unit) 55 and the demand side connection identifying means (unit) 53. An output of the power source selection means (unit) 55 is connected with a demand power source 58.

A zoom demand means (unit) includes the potentiometer 41. The signal from the potentiometer 41 is captured as the zoom demand signal into the demand CPU 44 through the amplifier 42 and the A/D converter 43.

The various switches 49 are provided on the zoom demand device 40 and used to issue demands such as a return switch demand, a VTR switch demand, a shot storage demand, and a shot demand (to generate demand signals or to transmit demand signals). The demand CPU 44 reads the demands from the switches as respective switch information. The shot demand is a demand for executing a drive demand stored in advance (by pushing a switch). Examples of the shot demand include a zoom speed shot demand for zooming at predetermined speed and a zoom frame shot demand for changing a zoom size to a stored zoom size. The respective display lamps 50 display results on the lens body 20 side which are obtained by processing based on various demands from the zoom demand device 40.

The zoom demand signal which is input to the demand CPU 44 and then output therefrom through the D/A converter 45 and the amplifier 46 is transmitted as the zoom analog demand signal "a" to the lens body 20 through the lens side connector 61, the demand side connector 62 and the connection cable 70. The zoom analog position signal "b" output from the lens body 20 through the demand side connector 62 is captured into the demand CPU 44 through the amplifier 47 and the A/D converter 48.

The lens supply power source 57 is supplied with electrical power from the lens body 20 through the lens side connector 61, the demand side connector 62 and the connection cable 70. The demand side wireless communication means (unit) 52 operates when wireless connection is made with the lens body 20. The demand side connection identifying means 53 identifies whether the connection with the lens body 20 is wired connection or wireless connection and identifies a state of the lens supply power source 57. The demand side connection processing means (unit) 51 selects whether the lens body 20 is to be connected by wire or wirelessly based on a result obtained by identification of the demand side connection identifying means (unit) 53.

The battery 56 is one of a primary battery and a secondary battery. The power source selection means 55 selects any one of the lens supply power source 57 and the battery 56, which is used as the demand power source 58. The electrical charge control means (unit) 54 controls whether or not the battery 56 is to be charged.

Multiple input and output signals have multiple signal types such as an analog signal type, a digital signal type, a parallel signal type, and a serial signal type. Each of the lens side wireless communication means (unit) 35 and the demand side wireless communication means (unit) 52 converts the multiple input and output signals into sequential time-series signals. The time-series signals are used for wireless transmission and reception. A wireless LAN system or a normalized communication system such as a Bluetooth system or a Zigbee system can be employed as a wireless system of each of the lens side wireless communication means (unit) 35 and the demand side wireless communication means (unit) 52.

Figures 2, 2A:
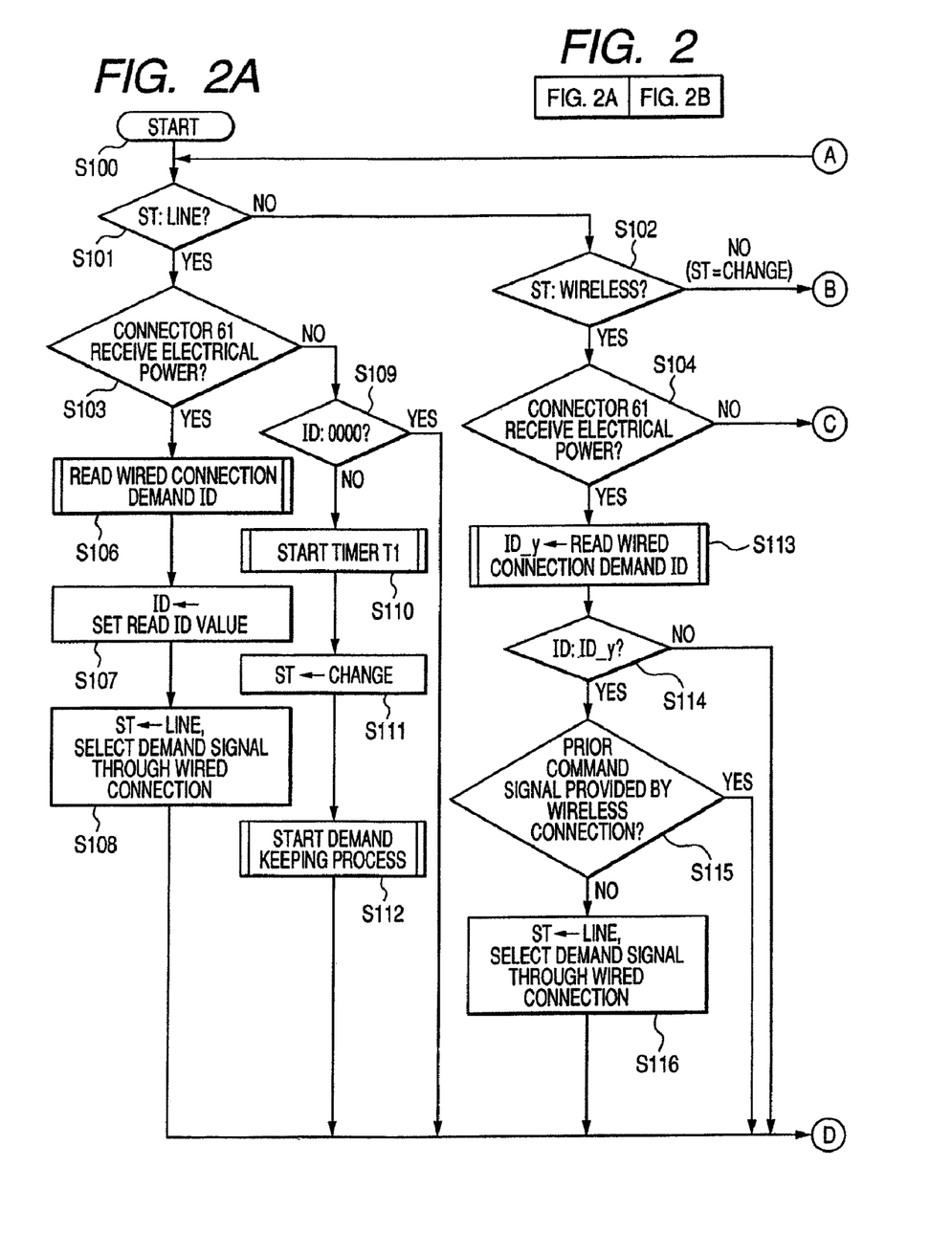
FIG. 2 is comprised of FIGS. 2A and 2B illustrating a flowchart illustrating a process of a lens side connection identifying means (unit) and a process of a lens side connection processor (processing unit) according to Embodiment 1 of the present invention.
Figure 2B:
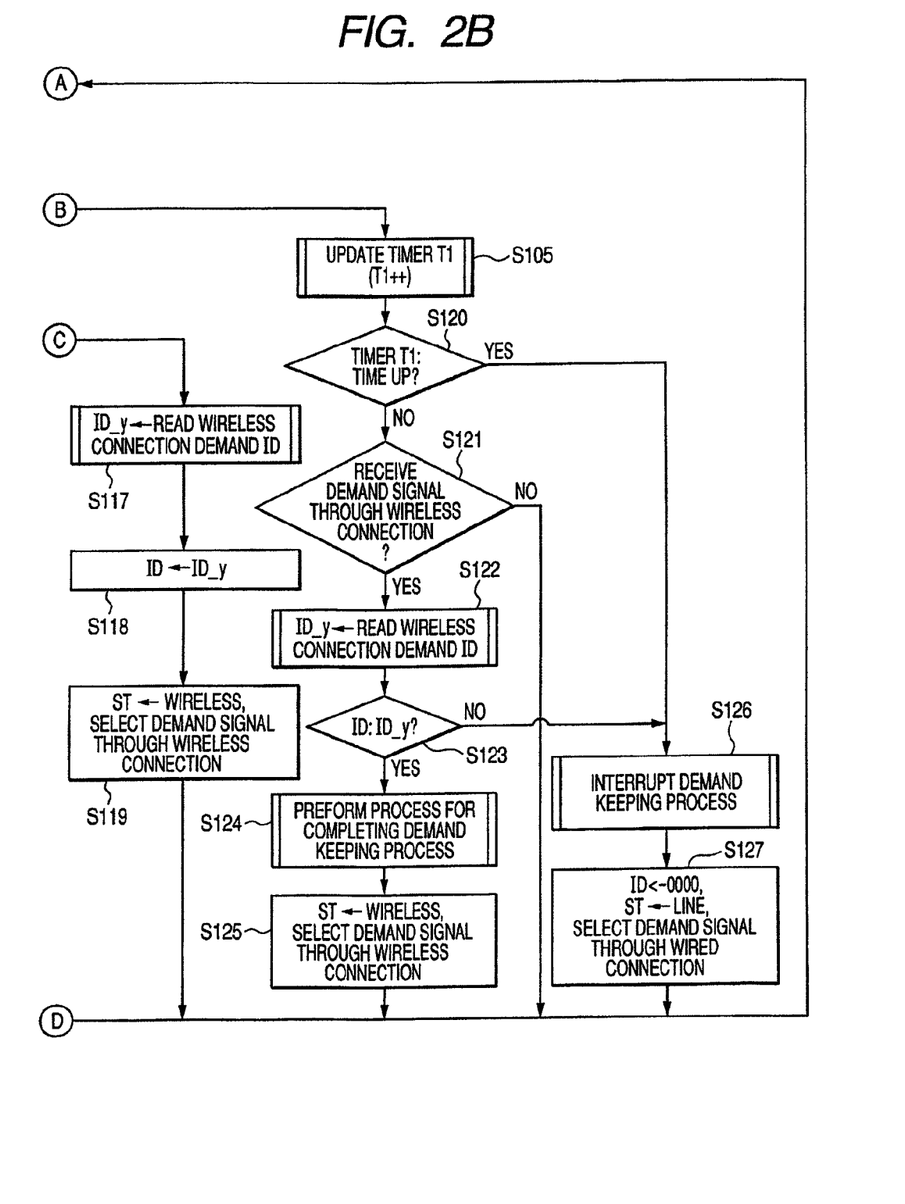

FIGS. 2A and 2B are flowcharts illustrating a process of the lens side connection processor (processing unit) 34 and a process of the lens side connection identifying means (unit) 36. Step S100 indicates the start of the process. In Steps S101 and S102, a preceding demand connection state is checked to perform processing corresponding to the demand connection state. The demand connection state is expressed as an argument ST. There are three demand connection states, that is, a wired connection state (ST=Line), a wireless connection state (ST=Wireless), and a state of change from the wired connection state to the wireless connection state (ST=Change). In Step S101, whether or not the demand connection state is the wired connection state is determined. When the demand connection state is the wired connection state, processing goes to Step S103. On the other hand, when the demand connection state is not the wired connection state, processing goes to Step S102. In Step S102, whether or not the demand connection state is the wireless connection state is determined. When the demand connection state is the wireless connection state, processing goes to Step S104. On the other hand, when the demand connection state is not the wireless connection state, processing goes to Step S105. When the demand connection state is the wired connection state, whether or not the power source current supplied from the lens side connector 61 to the demand device is detected is determined in Step S103.

The determination as to whether or not the power source current is detected is used to determine whether or not the demand device has the wired connection. When the current value is detected in Step S103, it is determined that the demand connection state is not changed, and then processing goes to Step S106. When the current value is not detected, it is determined that the cable for wired connection is removed and then processing goes to Step S109. In Step S106, individual information of the demand device having the wired connection is read. In Step S107, the individual information read as an argument ID is set. Then, processing goes to Step S108. The individual information of the demand device is arbitrary information. The individual information may be information capable of identifying whether or not the demand device is changed even when the demand connection state changes. In Step S108, the demand connection state (ST) is updated to the wired connection state (Line) and it is determined to employ the demand signal through the wired connection as a drive demand signal. Then, processing returns to Step S101.

When the cable for wired connection is removed and thus the demand connection state changes, it is determined in Step S109 whether or not an argument ID is "0000". When the argument ID is not "0000", processing goes to Step S110. When the argument ID is "0000", a state in which the demand signal is not received is determined and processing returns to Step S101 without any processing. Step S110 indicates a process executed in a case where the removal of the cable for wired connection is detected while the demand device has the wired connection up to now and the demand signal through the wired connection is being employed as the drive demand signal. First, a timer T1 starts and then processing goes to Step S111. In Step S111, the demand connection state (ST) is set to the state of change from the wired connection state to the wireless connection state (Change). Then, processing goes to Step S112. In Step S112, a demand keeping process starts.

The demand keeping process is a process for providing continuous lens drive control when the demand connection state is to be changed from the wired connection state to the wireless connection state. Specifically, the demand keeping process corresponds to the above-mentioned process for maintaining an operation executed for a predetermined period or in a stated order by using the demand side switches provided for the zoom speed shot demand and the zoom frame shot demand, even when the wired connection is changed to the wireless connection. The timer T1 is used to control a normal time for switching from the wired connection to the wireless connection. The argument ID is used to check whether or not the same demand connection state is held. Therefore, demand connection method switching with continuous lens drive control is enabled. After the demand keeping process starts in Step S112, processing goes to Step S101.

When the demand connection state is the wireless connection state, as in the case of Step S103, whether or not the power source current supplied from the lens side connector 61 to the demand device is detected is determined in Step S104 to determine whether or not the demand device has the wired connection. When it is determined in Step S104 that the demand device has the wired connection, processing goes to Step S113. When it is not determined that the demand device has the wired connection, processing goes to Step S117. In Step S113, the ID is read from the demand device having the wired connection. In Step S114, the read ID is compared with the present argument ID. When the read ID is equal to the present argument ID, processing goes to Step S115. When the read ID is different from the present argument ID, processing returns to Step S101. In Step S115, in order to determine which of demand signals to select in a case where both a demand signal through the wireless connection and a demand signal through the wired connection are received from the same demand device, whether a prior demand signal set in advance is the demand signal through the wireless connection and the demand signal through the wired connection is determined. When the prior demand signal is the demand signal through the wired connection, processing goes to Step S116. When the prior demand signal is not the demand signal through the wired connection, processing returns to Step S101. In Step S116, it is determined to employ the demand signal through the wired connection as the drive demand signal. Then processing returns to Step S101.

In Step S117, the individual information of the demand device is obtained through wireless communication. In Step S118, the individual information is substituted into the argument ID. Then, processing goes to Step S119. In Step S119, the demand connection state (ST) is set to the wireless connection state (Wireless) to determine the use of the demand signal through the wireless connection as a lens drive demand signal. Then, processing returns to Step S101.

When it is determined that the demand connection state is the state of change from the wired connection state to the wireless connection state, processing goes to Step S105. The timer T1 is updated (incremented) and then processing goes to Step S120. In Step S120, it is determined whether or not a predetermined time of the timer T1 elapses, that is, the time is up. When the time is not up, processing goes to Step S121. When the time is up, processing goes to Step S126.

In Step S121, it is determined whether or not a demand signal is received from the wireless communication means (unit) of the demand device. When the demand signal is received, processing goes to Step S122. When the demand signal is not received, processing returns to Step S101. In Step S122, the individual information of the demand device having the wireless connection is obtained. In Step S123, the individual information is compared with the argument ID in which the individual information of the demand device having the preceding wired connection is stored. When the individual information is equal to the argument ID, processing goes to Step S124. When the individual information is not equal to the argument ID, processing goes to Step S126. In Step S124, a process for completing the demand keeping process is performed. Specifically, when demands for respective shot operations are being kept, the operation is performed based on a demand signal from the demand device having the wireless connection immediately after the shot operations are completed. After Step S124, processing goes to Step S125. In Step S125, the demand connection state (ST) is set to the wireless connection state (Wireless) to employ the demand signal through the wireless connection as the drive demand signal. Then, processing returns to Step S101. In Step S126, it is determined that the switching from the wired connection to the wireless connection is not performed in the same demand device, and then the demand keeping process is interrupted. After that, processing goes to Step S127 to set the respective arguments in the same state as an initial state. In Step S127, the argument ID is set to "0000" indicating no demand connection. The demand connection state (ST) is set to the wired connection state (Line) to employ the demand signal through the wired connection as the drive demand signal. Then, processing returns to Step S101.

Figure 3:
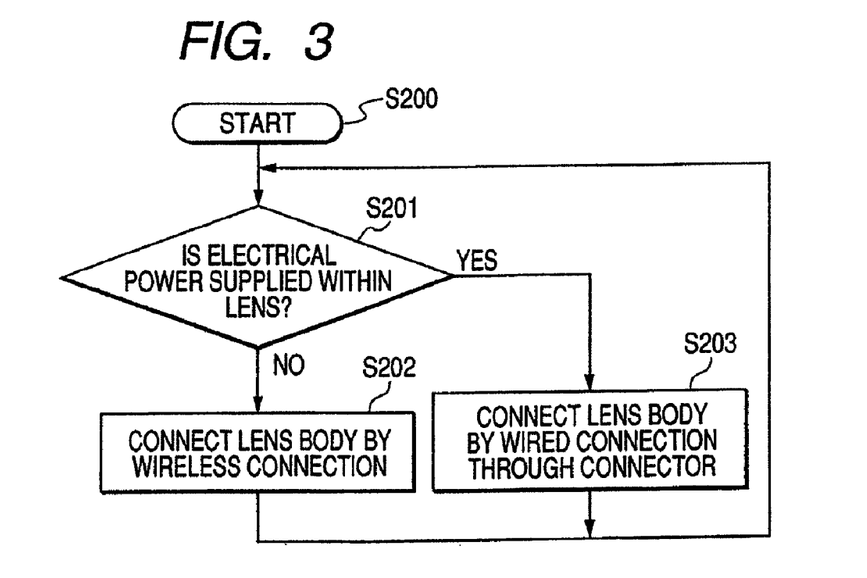
FIG. 3 is a flowchart illustrating a process of a demand side connection identifying means (unit) and a process of a demand side connection processor (processing unit) according to Embodiment 1 of the present invention.

FIG. 3 is a flowchart illustrating a process of the demand side connection processor (processing unit) 51 and a process of the demand side connection identifying means (unit) 53.

Step S200 indicates the start of the process. Processing goes to Step S201. In Step S201, whether or not electrical power is supplied to the lens supply power source 57 is checked and determined. When the electrical power is not supplied, processing goes to Step S202. When the electrical power is supplied, processing goes to Step S203. In Step S202, it is determined that the connection with the lens body 20 is not the wired connection, so the wireless connection is made with the lens body 20. In Step S203, it is determined that the connection with the lens body 20 is the wired connection, so the wired connection is made with the lens body 20. After the processes in Steps S202 and S203, processing returns to Step S201.

According to the structure and process as described above, the lens body 20 and the zoom demand device 40 can be connected with each other regardless of the presence and absence of the connection cable 70, with the result that any of the wired connection and the wireless connection can be used to connect between the lens body 20 and the zoom demand device 40. When the lens body 20 and the zoom demand device 40 are held close to each other at the time of photographing, the normal wired connection is employed for operation. When the lens body 20 and the zoom demand device 40 are provided at a distance at the time of photographing, the wireless connection is employed for operation. Therefore, installation work at the time of switching between operations can be made easy and the reduction in reliability is prevented.

Thus, the switching between the tripod operation and the shoulder-mounted operation can be performed by one-touch action. A work labor and a risk of cable break in a case where a conventional cable is extendedly provided are eliminated. Operational mode switching of the lens body 20 and the zoom demand device 40, which is changed/required according to a state of photographing such as drama photographing, music photographing, news photographing, sport photographing, studio photographing, or outdoor photographing, is easily enabled, and operability is improved.

Even when the wired connection is switched to the wireless connection or the wireless connection is switched to the wired connection, the drive demand signal of the lens apparatus can be maintained continuously. Therefore, photographing is not interrupted even when the connection system is switched. As described above, the demand keeping process is performed for the shot operation. Even in the case of the functional process for drive-controlling the movable optical members, a part of the initializing operation of the demand device may be kept. Whether or not the demand keeping process is performed may be selected for each function.

Figure 4:
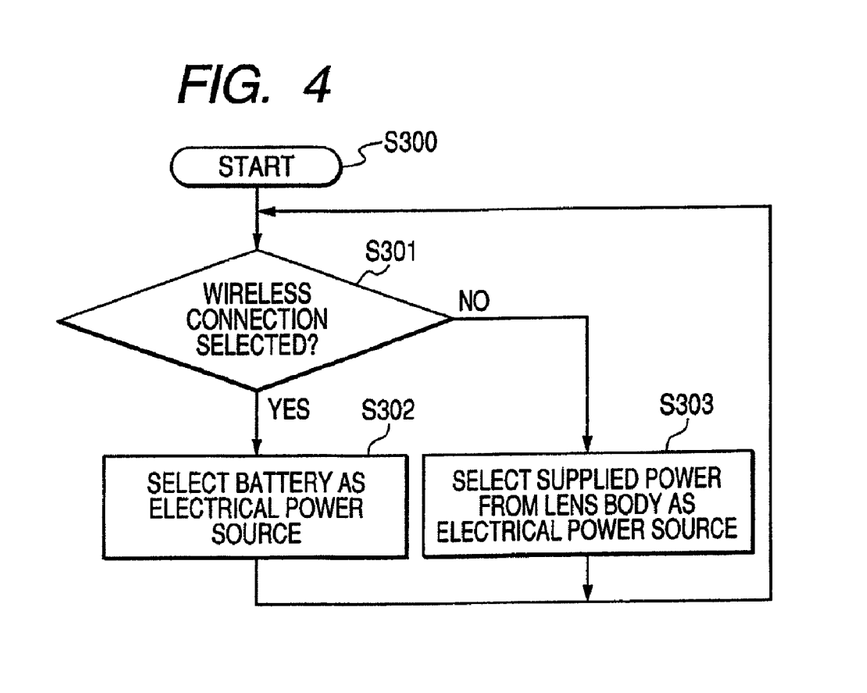
FIG. 4 is a flowchart illustrating a process of a power source selection means (unit) of a zoom demand device according to Embodiment 1 of the present invention.

FIG. 4 is a flowchart illustrating a process of the power source selection means (unit) 55 of the zoom demand device 40. Step S300 indicates the start of the process. In Step S301, when a result obtained by selection of the demand side connection processor 51 exhibits the wireless connection, processing goes to Step S302. When the result exhibits the wired connection, processing goes to Step S303. In Step S302, the battery 56 is selected as the power source for supplying electrical power to the zoom demand device 40 having the wireless connection. In Step S303, the lens supply power source 57 supplied with electrical power from the lens body 20 is selected as the power source for supplying electrical power to the zoom demand device 40 having the wired connection. After the processes in Steps S302 and S303, processing returns to Step S301.

Therefore, in the case of the wired connection, the power source to be used in the zoom demand device 40 is the power source supplied with electrical power from the lens body 20. In the case of the wireless connection, the power source to be used is switched to the battery 56 of the zoom demand device 40. According to such a process, each of the wired connection and the wireless connection can be used to connect between the lens body 20 and the zoom demand device 40. The battery 56 is not used in the case of the wired connection, so the life of the battery 56 can be lengthened.

Figure 5:
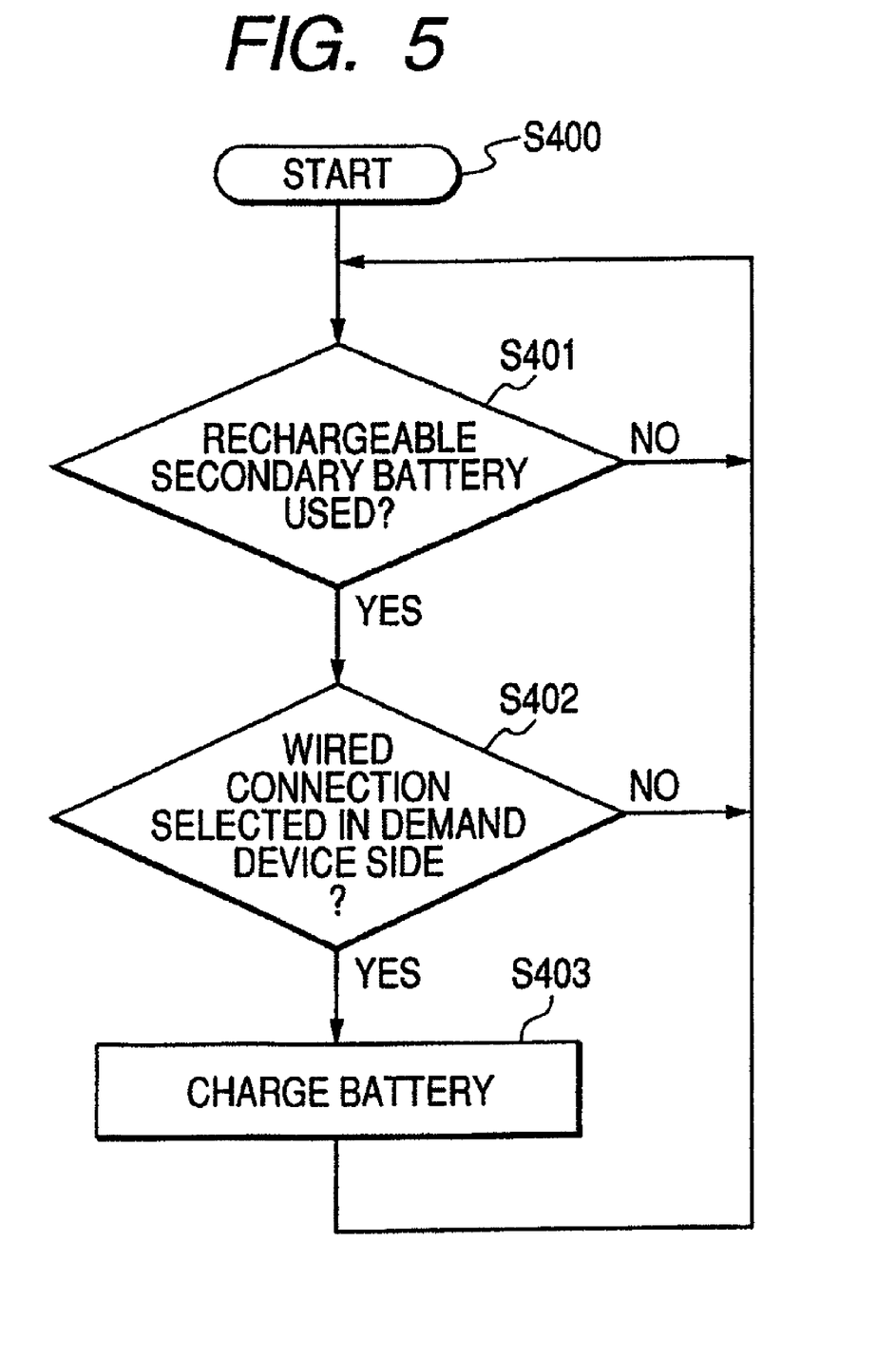
FIG. 5 is a flowchart illustrating a process of an electrical charge control means (controller, control unit) of the zoom demand device according to Embodiment 1 of the present invention.

FIG. 5 is a flowchart illustrating a process of the electrical charge control means (unit) 54 of the zoom demand device 40. Step S400 indicates the start of the process. In Step S401, whether or not the battery 56 is a rechargeable secondary battery is determined. When the rechargeable secondary battery is used, processing goes to Step S402 to display a message indicating the rechargeable secondary battery on a display (not shown). When a primary battery which is not rechargeable is used, processing returns to Step S401.

The determination in Step S401 may be made based on an on/off state of a setting switch. In Step S402, whether or not the result obtained by selection of the demand side connection processor 51 exhibits the wired connection is determined. When the result exhibits the wired connection, processing goes to Step S403 and the battery 56 starts to be charged. When the result exhibits the wireless connection, processing returns to Step S401.

In the process described above, when the rechargeable secondary battery is mounted on the zoom demand device 40 and the lens body 20 has the wired connection with the zoom demand device 40 through the connection cable 70, the electrical charge control means (unit) 54 charges the battery 56. Therefore, even when the wired connection is switched for operation to the wireless connection, a defect is prevented from being caused by battery exhaustion.

As described above, electrical power is supplied by the power source selection means (unit) 55 of the zoom demand device 40 from the lens body 20 to the zoom demand device 40 in the case of the wired connection. The battery 56 of the zoom demand device 40 is used in the case of the wireless connection. Therefore, when the connection system is changed, the operation can be performed without being interrupted. In the case of the wired connection, the battery 56 of the zoom demand device 40 can be charged, so the life of the battery 56 can be further lengthened.

Embodiment 2

Figure 6:
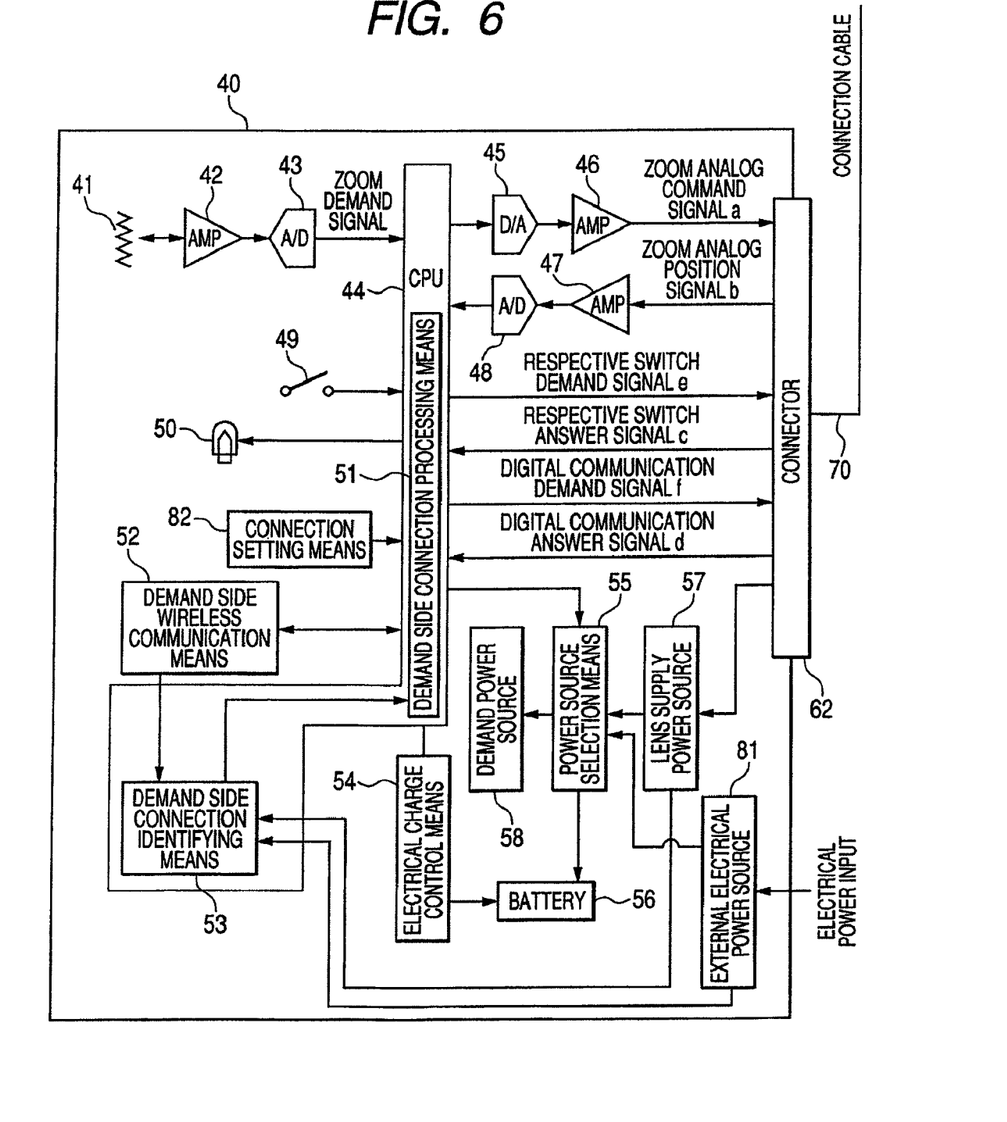
FIG. 6 is a structural diagram illustrating a zoom demand device according to Embodiment 2 of the present invention.

FIG. 6 is a structural diagram illustrating a zoom demand device according to Embodiment 2 of the present invention. The same members as those in Embodiment 1 are expressed by the same reference symbols. Embodiment 2 is different from Embodiment 1 in that an external electrical power source 81 and a connection setting means (unit) 82 are further provided in the zoom demand device 40.

The external electrical power source 81 of the zoom demand device 40 is directly input with electrical power from the outside. A power source supply state indicating whether or not the external electrical power source 81 is supplied with electrical power from the outside is identified by the power source selection means (unit) 55 and the demand side connection identifying means (unit) 53.

Figure 7:
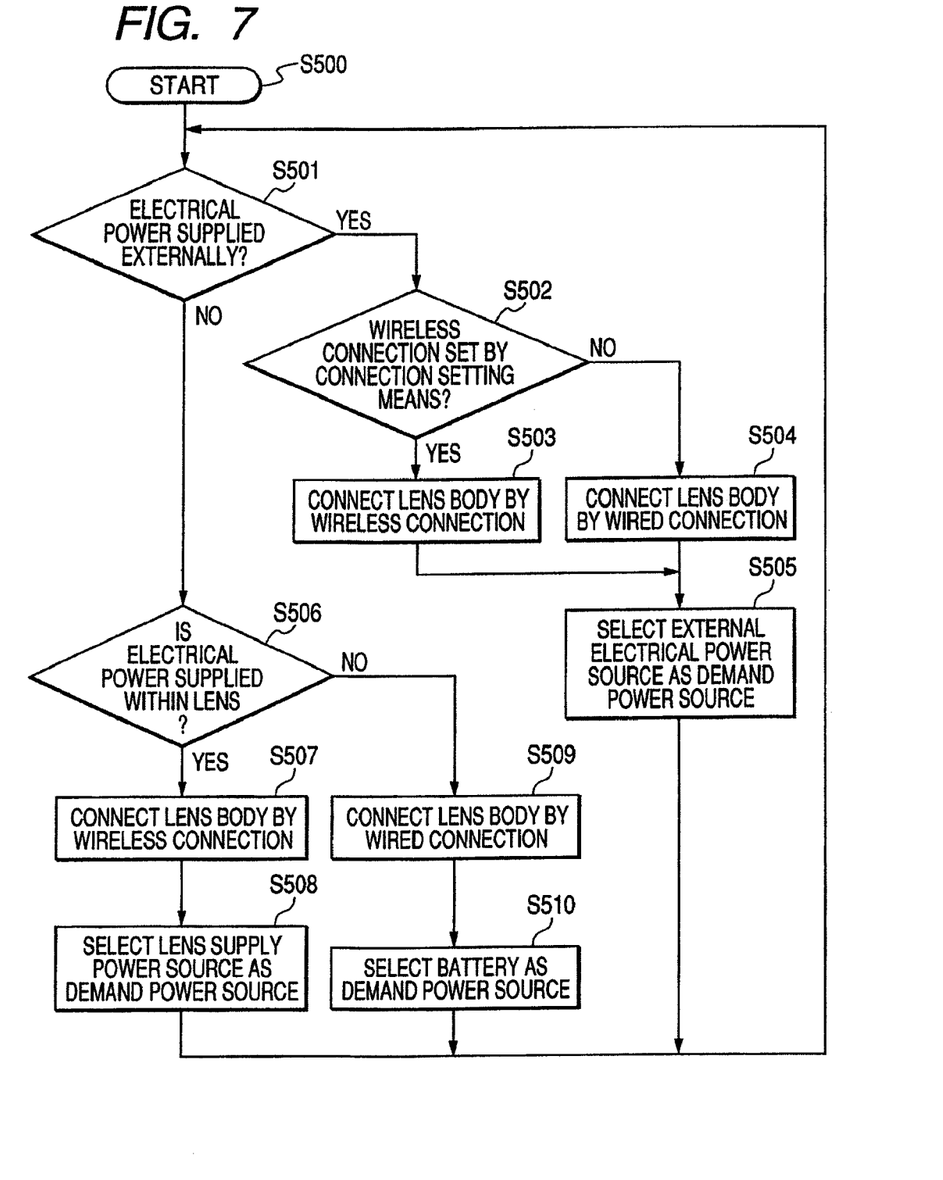
FIG. 7 is a flowchart illustrating a process of a demand side connection identifying means (unit), a process of a power source selection means (unit), and a process of a connection setting means (unit) according to Embodiment 2 of the present invention.

The connection setting means (unit) 82 executes a process illustrated in a flowchart of FIG. 7 to select and set one of the wired connection and the wireless connection by a camera operator. The process is realized by the switching on/off of the connection setting means (unit) 82.

In FIG. 7, Step S500 indicates the start of the process. Processing goes to Step S501. In Step S501, whether or not the electrical power is supplied to the external electrical power source 81 is checked and determined. When the electrical power is supplied, processing goes to Step S502. When the electrical power is not supplied, processing goes to Step S506. In Step S502, whether or not the connection setting means (unit) 82 indicates the wireless connection is checked and determined. When the wireless connection is set, processing goes to Step S503. When the wired connection is set, processing goes to Step S504.

In Step S503, it is determined by the connection setting means (unit) 82 that the wireless connection is made with the lens body 20. In Step S504, it is determined by the connection setting means (unit) 82 that the wired connection is made with the lens body 20. Then, processing goes to Step S505. In Step S505, the external electrical power source 81 is selected as the demand power source 58 and processing returns to Step S501.

In Step S506, whether or not the electrical power is supplied to the lens supply power source 57 is checked and determined. When the electrical power is supplied, processing goes to Step S507. When the electrical power is not supplied, processing goes to Step S509. In Step S507, the wired connection is made with the lens body 20 and processing goes to Step S508. In Step S508, the lens supply power source 57 is selected as the demand power source 58 and processing returns to Step S501. In Step S509, the wireless connection is made with the lens body 20 and processing goes to Step S510. In Step S510, the battery 56 is selected as the demand power source 58 and processing returns to Step S501.

As described above, unlike Embodiment 1, the external electrical power source 81 and the connection setting means (unit) 82 are further provided, so the external electrical power source 81 such as an A/D converter can be used in the zoom demand device 40. When the external electrical power source 81 is provided, any one of the wired connection system and the wireless connection system can be set arbitrarily by the connection setting means (unit) 82. Thus, when the external electrical power source 81 is used, any one of the wired/wireless connection methods can be selected, with the result that the present invention can be applied to various operational states.

When the external electrical power source 81 is provided, the battery 56 can be charged, whereby a defect is prevented from being caused by battery exhaustion and the operability is further improved.

According to the lens apparatus in this embodiment, any of the wired connection and the wireless connection can be used for connection with the demand device. The connection mode can be easily switched according to a photographing state without the reduction in reliability. Even when the wired connection is switched to the wireless connection or the wireless connection is switched to the wired connection, the drive demand signal of the lens apparatus can be maintained continuously. Therefore, photographing is not interrupted even when the connection system is switched.

In the case of wired connection, the demand device is supplied with electrical power from the lens apparatus. In the case of the wireless connection, the battery contained in the demand device is used. In such cases, even when the connection system is changed, the operation can be performed without being interrupted and the life of the battery of the demand device is lengthened.

In the case where the external electrical power source is used as the power source of the demand device, when arbitrary selection between the wired connection and the wireless connection is enabled, setting corresponding to an operational mode can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens apparatus for driving an optical member based on a demand signal from a demand device, comprising:
   a connector receiving the demand signal from the demand device by wire;
   a wireless receiver wirelessly receiving the demand signal from the demand device; and
   an identifying section identifying whether or not the demand device and the lens apparatus have a wired connection with each other, wherein:
   the demand signal from the demand device is selected based on a result obtained by the identifying section; and
   the optical member is driven based on the selected demand signal,
   wherein, when the identifying section determines that the demand signal from the demand device is received by wire, the demand signal received by the wireless receiver is neglected.

2. A demand device for generating a demand signal for driving a movable optical member of a lens apparatus by an operation of an operational member, comprising:
   a first wireless communication unit wirelessly transmitting the demand signal to the lens apparatus;
   a first connection identifying section detecting whether or not electrical power is supplied from the lens apparatus through a wired connection and identifying whether a present demand signal is transmitted through the wired connection or a wireless connection;
   a first connection processing unit determining whether the demand signal is transmitted to the lens apparatus through the wired connection or by the first wireless communication unit, based on a result obtained by the first connection identifying section; and
   a power source selection unit selecting electrical power used for the demand device based on a result obtained by the first connection processing unit.

3. A demand device according to claim 2, further comprising:
   a secondary battery; and
   an electrical charge control unit charging the secondary battery of the demand device based on a result obtained by the second connection processing unit.

4. A demand device according to claim 2, further comprising:
   a battery; and
   a display displaying whether or not the battery of the demand device is rechargeable.

* * * * *